(12) United States Patent
Feitelberg et al.

(10) Patent No.: US 6,432,368 B1
(45) Date of Patent: Aug. 13, 2002

(54) STAGED CATALYTIC AMMONIA DECOMPOSITION IN INTEGRATED GASIFICATION COMBINED CYCLE SYSTEMS

(75) Inventors: Alan S. Feitelberg; Raul Eduardo Ayala, both of Clifton Park; Stephen Lan-Sun Hung, Waterford; David Joseph Najewicz, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/269,797

(22) Filed: Jun. 30, 1994

(51) Int. Cl.$^7$ .................................................. B01J 8/04
(52) U.S. Cl. ........................ 422/190; 48/128; 48/210; 48/197 R; 60/775; 60/780; 60/781; 60/39.12; 422/187; 422/188; 422/189; 422/191; 422/198; 422/200; 422/211; 423/650; 423/655; 423/656
(58) Field of Search ................ 48/197 R, 210, 48/77, 128; 60/39.12, 39.182, 39.02, 39.01, 772, 775, 780, 781; 423/655, 656, 239.1, 237, 650; 422/169, 170, 171, 173, 177, 187, 188, 189, 190, 191, 192, 198, 200, 211

(56) References Cited

U.S. PATENT DOCUMENTS

| | | | | |
|---|---|---|---|---|
| 3,825,501 A | * | 7/1974 | Muenger | 423/655 |
| 3,850,841 A | * | 11/1974 | Aldridge et al. | 423/655 |
| 3,904,386 A | * | 9/1975 | Graboski et al. | 423/606 |
| 4,003,978 A | * | 1/1977 | Shiraishi et al. | 423/239.1 |
| 4,124,629 A | * | 11/1978 | Hansford | 423/655 |
| 4,155,990 A | * | 5/1979 | Kimura et al. | 423/574.1 |
| 4,202,167 A | * | 5/1980 | Suggitt et al. | 60/39.02 |
| 4,259,312 A | * | 3/1981 | Flockenhaus et al. | 423/655 |

(List continued on next page.)

OTHER PUBLICATIONS

Richard G. Copperthwaite et al., "Cobalt Chromium Oxide: A Novel Sulphur Tolerant Water—Gas Shift Catalyst," Applied Catalysis, vol. 63, 1990, pp. L11–L16.

D.G. Rethwisch et al., "The Effect of Metal–Oxygen Bond Strength on Properties of Oxides," Applied Catalysis, vol. 21, 1986, pp. 97–109.

Enrique D. Negri, et al., "Direct Reduction of Hematite in a Moving–Bed Reactor," Ind. Eng. Chem. Res., vol. 30, No. 3, 1991, pp. 474–482.

G.N. Krishnan et al., "Study of Ammonia Removal in Coal Gasification Processes," Final Report, Prepared for U.S. Dept. of Energy, Morgantown Energy Technology Center, Sep. 1988, pp. ii–iii.

D.G. Rethwisch et al., "Adsorptive and Catalytic Properties of Supported Metal Oxides," Journal of Catalysis, vol. 101, 1986, pp. 35–42.

Primary Examiner—Marian C. Knode
Assistant Examiner—Basia Ridley
(74) Attorney, Agent, or Firm—Patrick K. Patnode; Christian G. Cabou

(57) ABSTRACT

The ammonia content of fuel gas in an IGCC power generation system is reduced through ammonia decomposition, thereby reducing the $NO_x$ emissions from the plant. The power generation system includes a gasifier, a gas turbine and at least one catalytic reactor arranged between the gasifier and the gas turbine. The catalytic reactor may be either a three stage or two stage device. The three stage reactor includes a first catalyst which promotes water-gas-shift, a second catalyst which promotes CO methanation, and a third catalyst which promotes ammonia decomposition. The two stage reactor includes a first catalyst which promotes water-gas-shift and CO methanation and a second catalyst which promotes ammonia decomposition. The plural catalytic stages may be disposed in a single vessel or successively disposed in individual vessels, and the catalysts may be in a pelletized form or coated on honeycomb structures.

13 Claims, 3 Drawing Sheets

U.S. PATENT DOCUMENTS

| | | | |
|---|---|---|---|
| 4,476,683 A | * 10/1984 | Shah et al. | 423/605 |
| 4,699,632 A | * 10/1987 | Babu | 48/197 R |
| 4,778,485 A | * 10/1988 | Suggitt et al. | 48/197 R |
| 4,832,704 A | * 5/1989 | Grindley | 48/197 R |
| 4,833,877 A | * 5/1989 | Ahland et al. | 60/39.02 |
| 4,999,030 A | * 3/1991 | Skinner et al. | 48/203 |
| 5,069,685 A | * 12/1991 | Bissett et al. | 48/77 |
| 5,188,811 A | 2/1993 | Ayala | 423/230 |
| 5,220,782 A | * 6/1993 | Brown et al. | 60/39.02 |
| 5,243,922 A | * 9/1993 | Rehmat et al. | 48/77 |
| 5,313,781 A | * 5/1994 | Toda et al. | 60/39.12 |
| 5,391,530 A | * 2/1995 | Nowitzi et al. | 423/239.1 |
| 5,403,366 A | * 4/1995 | Leininger et al. | 48/197 R |

* cited by examiner

STAGED CATALYTIC AMMONIA DECOMPOSITION IN INTEGRATED GASIFICATION COMBINED CYCLE SYSTEMS

BACKGROUND OF THE INVENTION

This invention relates generally to a staged catalytic process for reducing the ammonia concentration in the gas produced by a gasifier, particularly an oxygen-blown coal gasifier in an integrated gasification combined cycle power plant equipped with high temperature desulfurization.

In integrated gasification combined cycle (IGCC) power plants, low Btu fuel gas produced by a gasifier is burned and expanded through a gas turbine, and the exhaust heat from the gas turbine is used to generate steam for a steam turbine. The low Btu fuel gas can be produced by gasifying coal, biomass, municipal solid waste, wood chips, heavy residual oil, petroleum coke, refinery wastes and other materials. As used herein, the term "fuel gas" refers to gas produced by any such gasification process. IGCC systems are attractive because of their high efficiency and because they can use relatively abundant and/or inexpensive energy sources.

Since the fuel gas produced by gasification typically contains high levels of hydrogen sulfide ($H_2S$), a sulfur removal system must be employed. Currently, both low temperature and high temperature desulfurization schemes are used. Hot gas clean up (HGCU) is a high temperature sulfur removal scheme which has several advantages over low temperature schemes, most notably increased system efficiency and decreased cost. HGCU reduces the sulfur in the fuel gas to less than 50 ppmv $H_2S$ and is typically carried out in the range of approximately 800–1200° F. This temperature regime is near optimal for desulfurization because at temperatures below about 800° F. the overall power plant efficiency decreases, while at temperatures above about 1200° F. the efficiency and stability of the desulfurization sorbents decrease. However, high temperature fuel gas tends to have a high ammonia content, about 1000–2000 ppmv. This high ammonia content results in high $NO_x$ emissions when the fuel gas is burned. Thus, the ammonia content of the high temperature fuel gas must be decreased to reduce $NO_x$ emissions.

One way to reduce the ammonia content of the fuel gas is to promote ammonia decomposition. However, known catalysts that are active for ammonia decomposition in the range of 800–1200° F. are easily poisoned by as low as a few parts per million of $H_2S$. At temperatures where sulfur poisoning is less of a problem (about 1400° F.), these catalysts have poor mechanical/chemical stability, i.e., loss of surface area because of sintering. Similarly, catalysts that are sulfur resistant and mechanically stable at 1400° F. tend not to be active enough towards ammonia decomposition at lower temperatures near 1000° F. Hence, operation of an ammonia decomposition catalyst at the same temperature as a high temperature desulfurization system may not be easily implementable.

Accordingly, there is a need for a process and apparatus for reducing the ammonia concentration of high temperature fuel gas which can fit into the constraints of an IGCC power plant having high temperature sulfur removal.

SUMMARY OF THE INVENTION

The above-mentioned needs are met by the present invention in which the ammonia content of fuel gas is reduced through ammonia decomposition. This is accomplished with a staged catalytic process in which the ammonia decomposition reaction is facilitated by first promoting CO methanation and water-gas-shift.

Specifically, the present invention provides a power generation system comprising a gasification unit, a hot gas desulfurization system, a particulate removal system, and a gas turbine. A catalytic reactor is arranged between the hot gas desulfurization system and the gas turbine. The catalytic reactor contains a plurality of catalysts which collectively promote water-gas-shift, methanation of CO, and ammonia decomposition. Preferably, a second catalytic reactor is provided in parallel with the first reactor so that the two reactors can alternately receive fuel gas from the desulfurization system. A coolant injection port or heat exchanger is formed in the gas line connecting said the catalytic reactor and the gas turbine to cool the fuel gas.

Each catalytic reactor may be a three stage device that includes a first catalyst which promotes water-gas-shift, a second catalyst which promotes methanation of CO, and a third catalyst which promotes ammonia decomposition. The catalytic reactor can comprise a single vessel containing all of the catalysts, or it can comprise a first vessel containing the first catalyst, a second vessel containing the second catalyst, and a third vessel containing the third catalyst. The three vessels are connected in order between the desulfurization system and the gas turbine. The power generation system can further include heat exchangers disposed in the first and/or second vessels. The heat exchangers can be connected to the injection port or to the steam turbine.

Alternatively, the catalytic reactor may be a two stage device that includes a first catalyst which promotes water-gas-shift and methanation of CO, and a second catalyst which promotes ammonia decomposition. This catalytic reactor can comprise a first vessel containing the first catalyst and a second vessel containing the second catalyst. The vessels are connected in order between the desulfurization system and the gas turbine. If using heat exchange, a heat exchanger would be disposed in the first vessel.

The vessels can be filled with catalysts in either a pelletized form or a fluidized bed. Alternatively, the catalytic reactor can comprise two or three honeycomb structures. Each honeycomb structure would be coated with the appropriate catalyst.

An advantage of the staged catalytic operation of the present invention is that it allows catalysts which individually are restricted to a narrow range of operating conditions to be used in sequence to accomplish the goal of reducing ammonia content that is not feasible by any single stage.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

The present invention reduces the ammonia content of the fuel gas produced by a gasifier by inducing ammonia decomposition. The minimum ammonia content that can be achieved by ammonia decomposition is determined by the equilibrium ammonia concentration of the fuel gas; that is, the lower the equilibrium ammonia concentration of the fuel gas is, the more the ammonia content can be reduced. The equilibrium ammonia concentration is a function of the temperature and pressure of the fuel gas as well as the overall composition of the gas. Although the equilibrium ammonia concentration is usually lower than the ammonia content of fuel gas, conditions are such that ammonia decomposition alone is often insufficient to adequately reduce the ammonia content. Thus, the present invention facilitates ammonia decomposition by promoting CO methanation and water-gas-shift.

The overall reaction that decomposes ammonia is $$2NH_3 = N_2 + 3H_2 \qquad (1)$$

Since this reaction is endothermic in the forward direction and increases hydrogen content, increasing the temperature of the fuel gas and reducing its hydrogen content will favor ammonia decomposition. The present invention increases temperature and reduces hydrogen content by promoting CO methanation and water-gas-shift. The CO methanation reaction is $$CO + 3H_2 = CH_4 + H_2O \qquad (2)$$

and the water-gas-shift reaction is $$CO + H_2O = CO_2 + H_2 \qquad (3)$$

Both of these reactions, which are typically not equilibrated at HGCU temperatures (about 800–1200° F.), are exothermic in the temperature range of interest and thus raise the fuel gas temperature. Furthermore, the CO methanation reaction consumes $H_2$, thereby reducing the overall hydrogen content.

Figure 1:
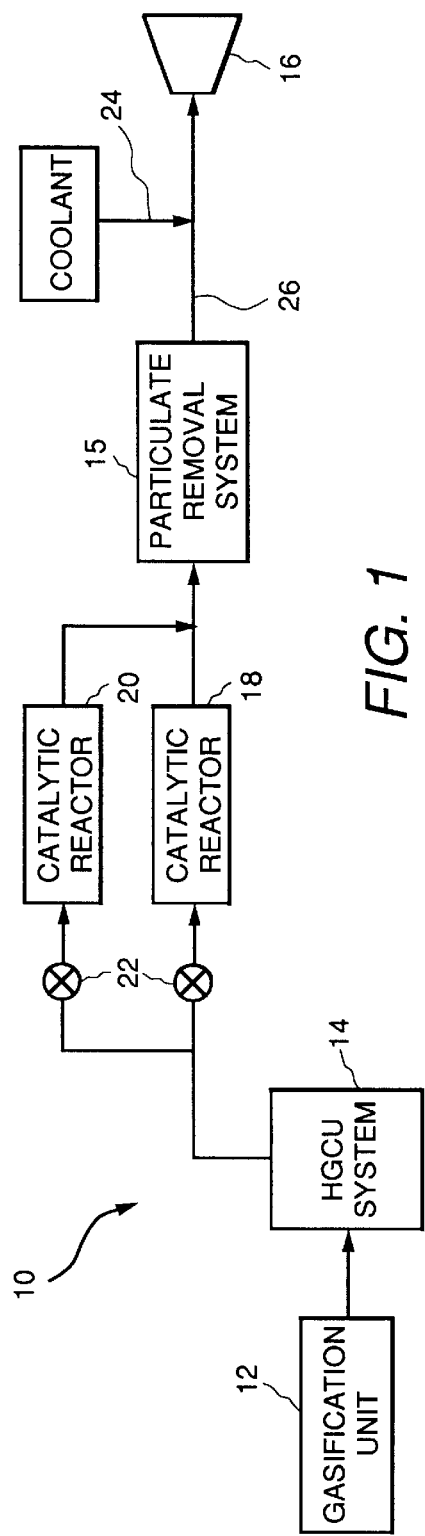
FIG. 1 is a schematic view of an IGCC system using staged catalytic ammonia decomposition in accordance with the present invention.

Referring to FIG. 1, an integrated gasification combined cycle (IGCC) system 10 of the present invention is shown schematically. The IGCC system 10 includes a gasification unit 12, a hot gas clean up (HGCU) system 14, a particulate removal system 15, and a gas turbine 16. As is well understood in the art, the gasification unit 12 comprises a gasifier, such as an oxygen-blown gasifier in which coal or other materials are reacted with steam in the presence of oxygen to produce fuel gas which is ultimately burned and expanded in the gas turbine 16 to generate power. In addition to a gasifier, the gasification unit 12 typically includes a radiant cooler and a cyclone for removing particulates. The fuel gas produced by the gasification unit 12 is delivered to the HGCU system 14 which removes hydrogen sulfide from the fuel gas.

Two staged catalytic reactors 18, 20 are located between the HGCU system 14 and the particulate removal system 15. Both of the catalytic reactors 18, 20 contain a plurality of catalysts arranged in stages so as to collectively promote methanation of CO, water-gas-shift, and ammonia decomposition. Two or three catalytic stages are typically required. In one embodiment, the staged catalytic reactors 18, 20 each comprise a single vessel having an inlet and an outlet at opposing ends so that fuel gas can be directed through each vessel. The plural stages of catalysts, in a pelletized form, are arranged in successive packed beds within the vessels.

The two catalytic reactors 18, 20 are connected in parallel so that desulfurized fuel gas from the HGCU system 14 can be caused (via conventional valves 22) to alternately pass through one or the other of the reactors 18, 20. In this way, only one of the reactors 18, 20 is in use at any given time. Meanwhile, the idle reactor can be either regenerated or replaced. A coolant injection port 24 is provided in the gas line 26 between the catalytic reactors 18, 20 and the gas turbine 16. The port 24 provides a means for the injection of a coolant, such as water or low temperature nitrogen, into the gas stream, thereby quenching the fuel gas to an allowable temperature for gas turbine operation (approximately 1000–1100° F.). A heat exchanger could be used as an alternative to the injection port 24.

Figure 2:
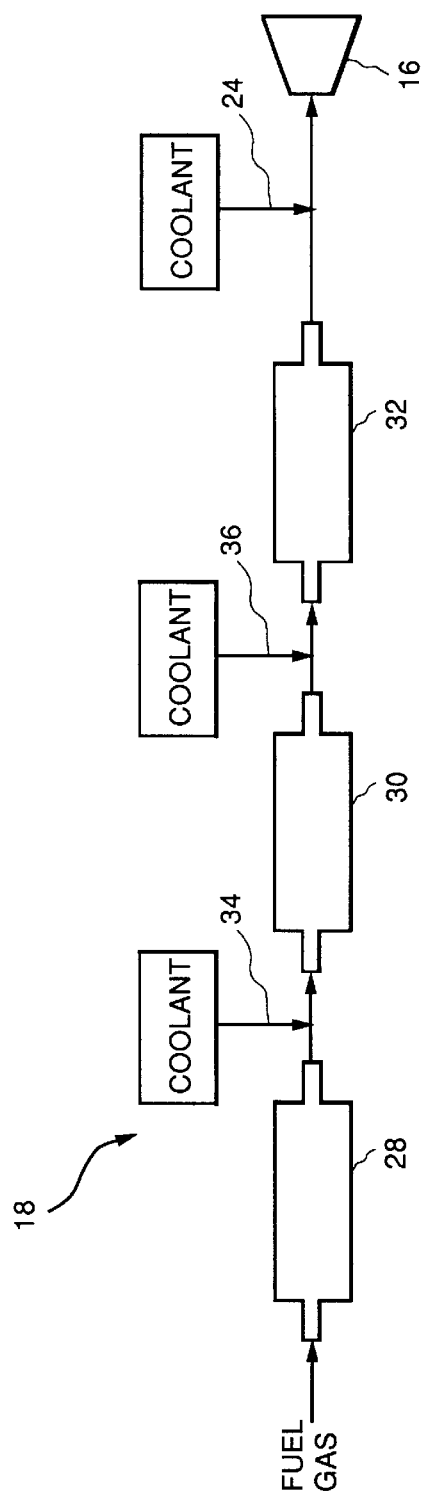
FIG. 2 shows a first embodiment of a catalytic reactor of the present invention.

FIG. 2 shows another embodiment of the staged catalytic reactors 18, 20 (for simplicity, only reactor 18 is shown) in which there is a separate vessel for each catalytic stage. The catalytic reactor 18 has three stages in the form of a first vessel 28 containing a first catalyst, a second vessel 30 containing a second catalyst and a third vessel 32 containing a third catalyst. The first catalyst promotes water-gas-shift, the second catalyst promotes methanation of CO, and the third catalyst promotes ammonia decomposition. The catalysts can be in either a pelletized form or a fluidized bed.

Each vessel 28, 30, 32 has an inlet and outlet so that fuel gas is able to pass through the vessels and contact the respective catalysts. The inlet of the first vessel 28 is connected to the HGCU system 14 (not shown in FIG. 2), while the outlet of the first vessel 28 is connected to the inlet of the second vessel 30. The outlet of the second vessel 30 is connected to the inlet of the third vessel 32, and the outlet of the third vessel 32 is connected to the gas turbine 16 via the particulate removal system 15 (not shown in FIG. 2). Optional coolant injection ports 34, 36 may be located between the first and second vessels 28, 30 and between the second and third vessels 30, 32, respectively, to actively control the temperature within each stage and to provide the added benefit of minimizing potential carbon deposits that can occur over catalyst surfaces in gas environments containing a high CO, low steam content.

Several materials are suitable as the catalysts for the present invention. Materials which can be used as water-gas-shift catalysts include sulfided cobalt-molybdenum and iron-based catalysts such as zinc ferrite ($ZnFe_2O_4$), ferric oxide ($Fe_2O_3$), magnetite ($Fe_3O_4$), and iron/chromia (90–95% $Fe_2O_3$ and 5–10% $Cr_2O_3$). Suitable CO methanation catalysts include cobalt-chromium oxide and an iridium promoted nickel catalyst commercially available under the tradename G65* from United Catalysts, Inc./SRI International. A nickel based catalyst commercially available under the tradename HTSR-1 from Haldor Topsoe serves well as the ammonia decomposition catalyst in the present invention. This catalyst is mechanically stable at 1400° F. and impervious to sulfur poisoning.

In operation, the gasification unit 12 produces fuel gas in the temperature range of about 800–1100° F. In one example, the fuel gas is at approximately 925° F. and 30 atmospheres. The composition of this fuel gas is given in Table 1. This is merely an exemplary composition based on the

TABLE 1

| Species | Volume |
|---------|--------|
| CO | 30–40% |
| $H_2$ | 25–30% |
| $CH_4$ | ~0.1% |
| $N_2$ | 4–5% |
| $CO_2$ | 10–15% |
| $H_2O$ | 15–20% |
| Ar | ~1% |
| $NH_3$ | 500–2500 ppm |
| $H_2S$ | 5000–10,000 ppm | typical output from an oxygen-blown gasifier; other gas compositions are possible. The fuel gas is then directed through the HGCU system 14 which reduces the $H_2S$ content to about 30 ppm. Next, the valves 22 are set to direct the fuel gas through the desired one of the catalytic reactors 18, 20.

The fuel gas passes through the first vessel 28 of the selected reactor where the first catalyst promotes the water-gas-shift reaction. This exothermic reaction raises the temperature of the fuel gas to about 1000–1100° F. Poisoning of the first catalyst does not occur, particularly for an iron-based catalyst, because the $H_2S$ concentration of the desulfurized gas is below the equilibrium vapor pressure of $H_2S$ over iron. The fuel gas then passes through the second vessel 30. At the raised temperature of about 1000–1100° F., the second catalyst is active toward CO methanation, a reaction that further raises the gas temperature to about 1400° F. Furthermore, the CO methanation reaction significantly lowers the hydrogen content of the fuel gas. Coolant is injected as needed through the coolant injection ports 34, 36 to actively control the temperature within each stage.

Lastly, the fuel gas passes through the third vessel 32. At 1400° F., the catalyst in the third vessel 32 actively promotes ammonia decomposition so as to reduce the ammonia content, which is the ultimate objective of the staged catalytic process. And because the first two stages raised the gas temperature and lowered the hydrogen content, a lower final ammonia content is obtained than would have been obtained through ammonia decomposition alone. The fuel gas exits the third vessel 32 at approximately 1500–1550° F. and 30 atmospheres. The composition of the fuel gas after the staged catalytic process is given in Table 2. As can be seen, the ammonia content

TABLE 2

| Species | Volume |
|---------|--------|
| CO | 25–30% |
| $H_2$ | 20–25% |
| $CH_4$ | ~5% |
| $N_2$ | 5–6% |
| $CO_2$ | 20–25% |
| $H_2O$ | 15–20% |
| Ar | ~1% |
| $NH_3$ | 170–230 ppm |
| $H_2S$ | ~30 ppm | is significantly decreased to about 170–230 ppm. The fuel gas is subjected to a final particulate clean up in the removal system 15. A coolant such as water or nitrogen is then injected through the coolant injection port 24 to quench the fuel gas, reducing the temperature to about 1000–1100° F., which is suitable for gas turbine operation. This temperature reduction can alternatively be accomplished with a heat exchanger. The fuel gas is then burned and expanded through the gas turbine 16 to generate power. Because of the low ammonia content, combustion of the fuel gas produces minimal $NO_x$ emissions.

Figure 3:
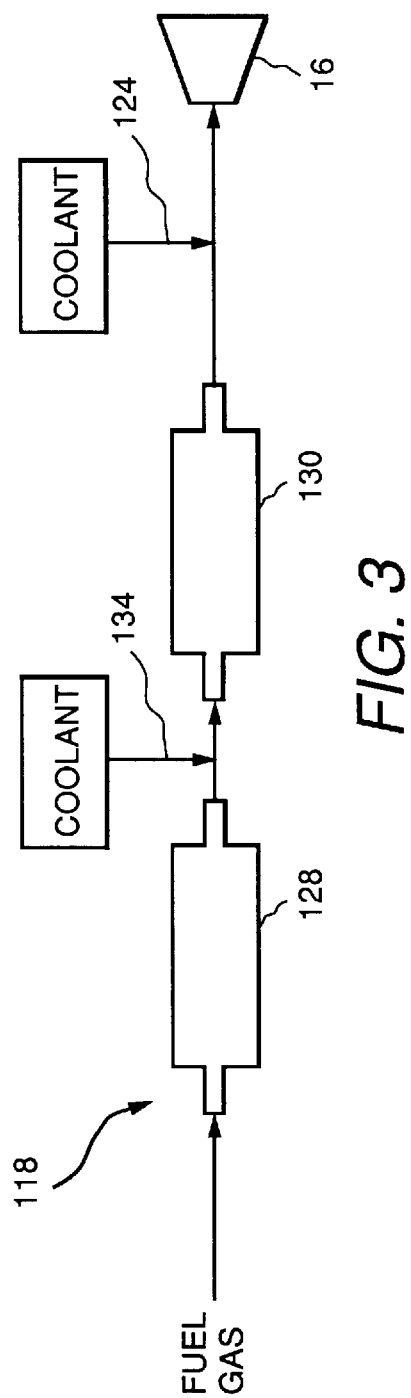
FIG. 3 shows a second embodiment of a catalytic reactor of the present invention.

Alternatively, the first two stages of the FIG. 2 embodiment could be combined into a single stage using a catalyst which promotes both water-gas-shift and methanation of CO. FIG. 3 shows such a two stage reactor 118 comprising a first vessel 128 containing a first catalyst and a second vessel 130 containing a second catalyst. The first catalyst promotes water-gas-shift and methanation of CO, and the second catalyst promotes ammonia decomposition. Each vessel 128, 130 has an inlet and outlet so that fuel gas is able to pass through the vessels and contact the respective catalysts. The inlet of the first vessel 128 is connected to the HGCU system 14 (not shown in FIG. 3), and the outlet of the first vessel 128 is connected to the inlet of the second vessel 130. The outlet of the second vessel 130 is connected to the gas turbine 16. A coolant injection port 124 is provided between the catalytic reactor 118 and the gas turbine 16 via the particulate removal system 15 (not shown in FIG. 3). An optional coolant injection port 134 may be located between the first and second vessels 128, 130 to actively control the temperature within each stage and to minimize carbon deposits that can occur over the catalyst surfaces.

The embodiment of FIG. 3 operates in essentially the same manner as the FIG. 2 embodiment except that water-gas-shift and CO methanation reactions are accomplished in one stage instead of two. Generally, any of the catalysts described above for use in catalyzing the water-gas-shift and CO methanation reactions can be used as the catalyst which promotes both water-gas-shift and methanation of CO. This is because most materials that are active for one reaction tend to be active for the other. The cobalt-chromium oxide catalyst is particularly suitable for dual water-gas-shift/CO methanation in the present invention.

Figure 4:
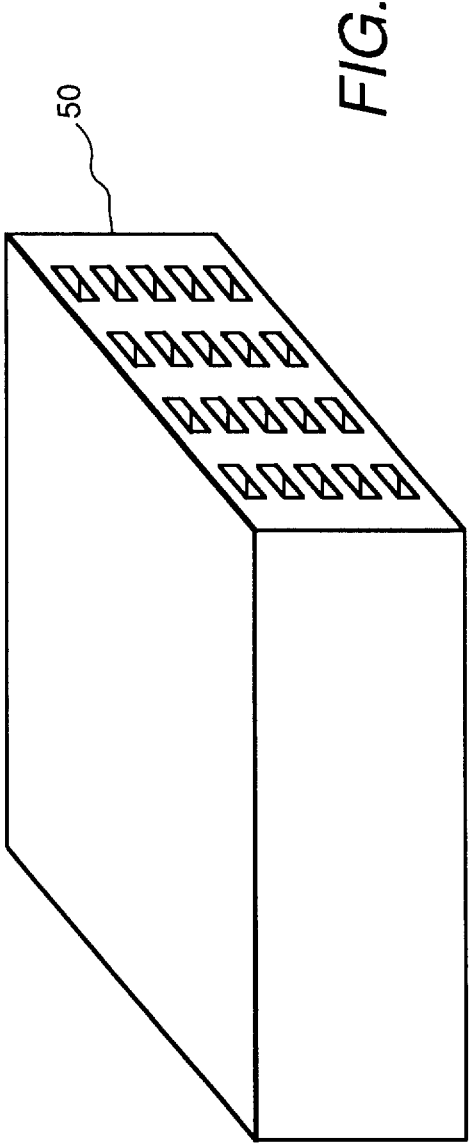
FIG. 4 shows a honeycomb structure in accordance with the present invention.

As an alternative to pelletized or fluidized beds of catalytic material, the catalytic reactors can comprise a plurality of low pressure drop honeycomb structures (such as the honeycomb structure 50 shown in FIG. 4) with the catalysts coated thereon. Each successive honeycomb structure would be coated with one of the catalysts; the number of honeycomb structures would thus correspond to the desired number of catalytic stages. Alternatively, a single honeycomb structure could be used with the catalysts coated thereon at successive locations. As with the pelletized or fluidized bed embodiments, the honeycomb structures could be used in either two or three stage arrangements. The use of honeycomb structures would provide lower pressure drops, although pressure drop is typically not a problem in IGCC systems.

Figure 5:
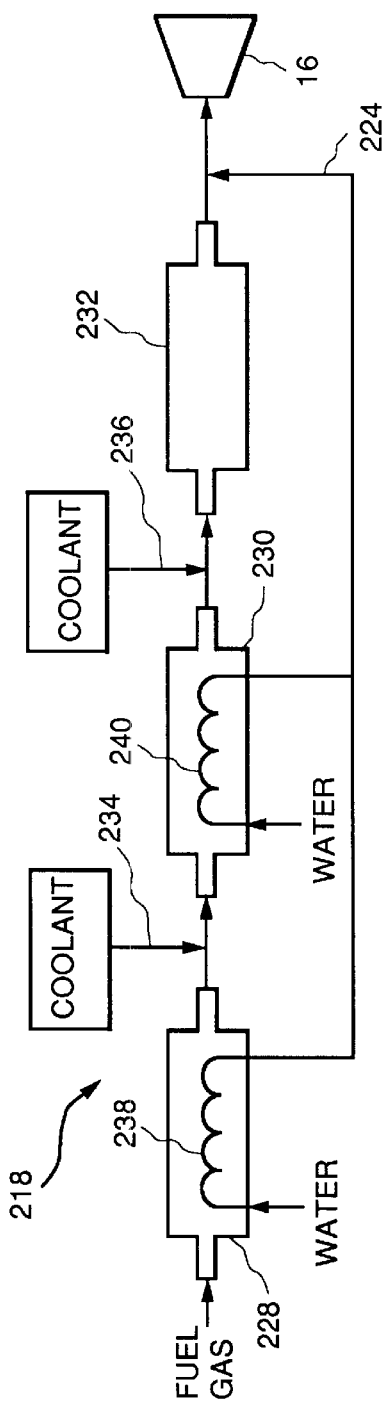
FIG. 5 shows a third embodiment of a catalytic reactor of the present invention.
Figure 6:
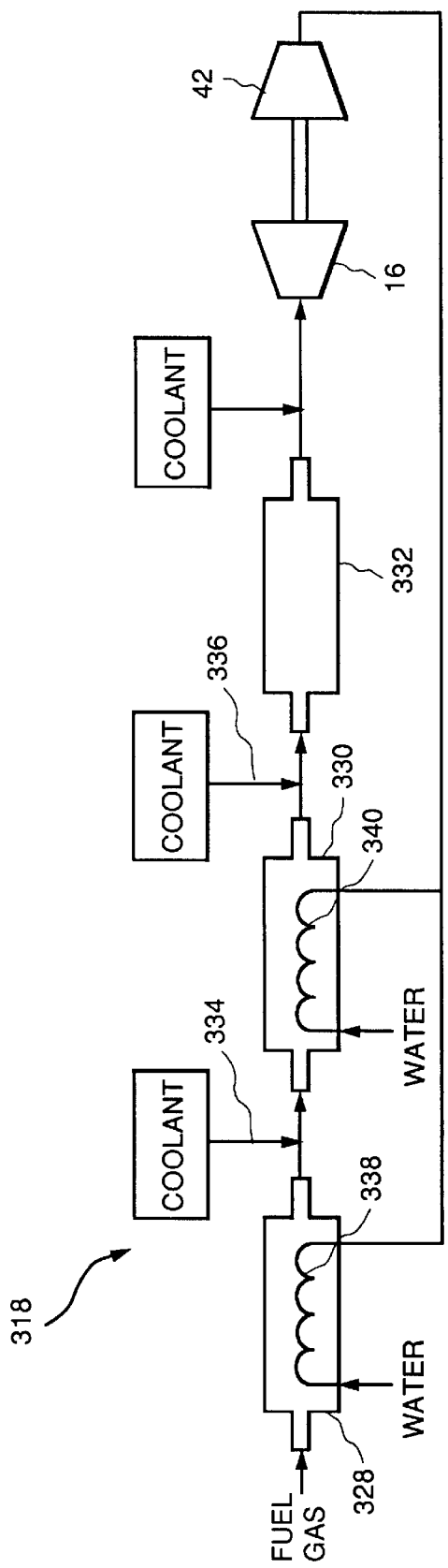
FIG. 6 shows a fourth embodiment of a catalytic reactor of the present invention.

FIGS. 5 and 6 show two additional reactor embodiments which, unlike the adiabatic reactors of FIGS. 2 and 3, are non-adiabatic. In FIG. 5, a catalytic reactor 218 has three stages in the form of a first vessel 228 containing a first catalyst, a second vessel 230 containing a second catalyst and a third vessel 232 containing a third catalyst. The first catalyst promotes water-gas-shift, the second catalyst promotes methanation of CO, and the third catalyst promotes ammonia decomposition. Optional coolant injection ports 234, 236 may be located between the first and second vessels 228, 230 and between the second and third vessels 230, 232, respectively. To the extent described thus far, the catalytic reactor 218 is the same as the FIG. 2 embodiment.

Catalytic reactor 218 differs in that first and second heat exchangers 238, 240 are located in the first and second vessels 228, 230, respectively. The heat exchangers 238, 240 remove heat from the vessels 228, 230 to control the temperature within each stage. The heat exchangers 238, 240 can thus operate in place of, or in addition to, the coolant injection ports 234, 236. The heat exchangers 238, 240 can comprise cooling tubes through which water is passed. The absorbed heat converts the water to steam. The steam generated by the heat exchangers 238, 240 is injected into the gas stream through the injection port 224 to lower the gas temperature to system limits. This downstream steam injection makes the overall process adiabatic.

FIG. 6 shows a non-adiabatic catalytic reactor 318 which is a variation of the FIG. 5 embodiment. The catalytic reactor 318 also has three stages in the form of a first vessel 328 containing a first catalyst, a second vessel 330 containing a second catalyst and a third vessel 332 containing a third catalyst. First and second heat exchangers 338, 340 are located in the first and second vessels 328, 330, respectively, to remove heat from the vessels 328, 330. As before, these heat exchangers 338, 340 can be used in place of, or in addition to, coolant injection ports 334, 336 located between the first and second vessels 328, 330 and the second and third vessels 330, 332, respectively. In this case, steam generated by the heat exchangers 338, 340 is used to drive a steam turbine 42 for additional power generation.

Although FIGS. 5 and 6 show the use of heat exchangers in three stage reactors, the heat exchangers are also applicable to two stage reactors. In a two stage reactor, the first vessel (i.e., the vessel provided with a catalyst which promotes water-gas-shift and CO methanation) would be provided with a heat exchanger. Steam generated by the heat exchanger could be either injected downstream of the reactor or used to drive a steam turbine.

The foregoing has described an apparatus and process for reducing the ammonia content of fuel gas in an IGCC power plant, thereby reducing the $NO_x$ emissions from the plant. While specific embodiments of the present invention have been described, it will be apparent to those skilled in the art that various modifications thereto can be made without departing from the spirit and scope of the invention as defined in the appended claims.

What is claimed is:

1. A reduced ammonia power generation system comprising:
    a gasification unit;
    a hot gas desulfurization system arranged to receive fuel gas from said gasification unit;
    at least one catalytic reactor arranged to receive fuel gas from said hot gas desulfurization system, said at least one catalytic reactor comprising a water-gas-shift stage for raising temperature of the fuel gas from said hot gas desulfurization system, a methanation of CO stage for raising temperature of fuel gas from the water-gas-shift stage and for consuming $H_2$ in said fuel gas from the water-gas-shift stage, and an ammonia decomposition stage for reducing ammonia content of fuel gas from said methanation of CO stage, in that sequence;
    a particulate removal system arranged to receive reduced ammonia fuel gas from said at least the catalytic reactor; and
    a gas turbine arranged to receive reduced ammonia fuel gas from said particulate removal system.

2. A reduced ammonia power generation system, in accordance with claim 1, wherein two catalytic reactors are arranged in parallel to one another so as to alternately receive the fuel gas from said hot gas desulfurization system.

3. A reduced ammonia power generation system, in accordance with claim 1, further comprising at least one gas line wherein each of said at least one catalytic reactors is connected by a corresponding gas line to said gas turbine, and a coolant injection port formed in each of said corresponding gas lines.

4. A reduced ammonia power generation system, in accordance with claim 1, wherein said water-gas-shift stage comprises a first catalyst which promotes reaction with said fuel gas from said hot gas desulfurization system causing said temperature of the fuel gas from said hot gas desulfurization system to increase, said methanation of CO stage comprises a second catalyst which promotes reaction with the fuel gas from the water-gas-shift stage causing the temperature of the fuel gas from the water-gas-shift stage to increase and causing $H_2$ level in said fuel gas from the water-gas-shift stage to decrease, and said ammonia decomposition stage comprises a third catalyst which promotes reaction with said fuel gas from said methanation of CO stage to reduce the ammonia content of said fuel gas from said methanation of CO stage.

5. A reduced ammonia power generation system, in accordance with claim 4, wherein said first catalyst is sulfided cobalt-molybdenum and said second catalyst is cobalt-chromium oxide.

6. A reduced ammonia power generation system, in accordance with claim 4, wherein said first catalyst is zinc ferrite and said second catalyst is cobalt-chromium oxide.

7. A reduced ammonia power generation system, in accordance with claim 4, wherein said first catalyst is sulfided cobalt-molybdenum and said second catalyst is an iridium promoted nickel catalyst.

8. A reduced ammonia power generation system, in accordance with claim 4, wherein said first catalyst is zinc ferrite and said second catalyst is an iridium promoted nickel catalyst.

9. A reduced ammonia power generation system, in accordance with claim 1, wherein said at least one catalytic reactor comprises a first vessel containing said water-gas-shift stage, a second vessel containing said methanation of CO stage, and a third vessel containing said ammonia decomposition stage.

10. A reduced ammonia power generation system, in accordance with claim 9, further comprising a heat exchanger disposed in at least one of said first and second vessels.

11. A reduced ammonia power generation system, in accordance with claim 1, wherein said at least one catalytic reactor comprises a first honeycomb structure containing said water-gas-shift stage, a second honeycomb structure containing said methanation of CO stage, and a third honeycomb structure containing said ammonia decomposition stage.

12. A reduced ammonia power generation system, in accordance with claim 11, wherein said first honeycomb structure is coated with a first catalyst which promotes reaction with said fuel gas from said hot gas desulfurization system causing said temperature of the fuel gas from said hot gas desulfurization system to increase, said second honeycomb structure is coated with a second catalyst which promotes reaction with the fuel gas from the water-gas-shift stage causing the temperature of the fuel gas from the water-gas-shift stage to increase and causing the $H_2$ level in said fuel gas from the water-gas-shift stage to decrease, and said third honeycomb structure is coated with a third catalyst which promotes reaction with said fuel gas from said methanation of CO stage to reduce the ammonia content of said fuel gas from said methanation of CO stage.

13. A reduced ammonia power generation system comprising:
- a gasification unit;
- a hot gas desulfurization system arranged to receive fuel gas from said gasification unit;
- at least one catalytic reactor arranged to receive fuel gas from said hot gas desulfurization system, said at least one catalytic reactor comprising a water-gas-shift and methanation of CO stage for raising temperature of fuel gas from said hot gas desulfurization system and for consuming $H_2$ in said fuel gas from said hot gas desulfurization system, and an ammonia decomposition stage for reducing ammonia content of fuel gas from said water-gas-shift and methanation of CO stage, in that sequence.

* * * * *